United States Patent [19]

Jeal

[11] Patent Number: 4,557,649
[45] Date of Patent: Dec. 10, 1985

[54] ANCHOR NUT FASTENER DEVICE

[75] Inventor: Harvey P. Jeal, Stevenage, England

[73] Assignee: Avdel Limited, Hertfordshire, England

[21] Appl. No.: 521,406

[22] Filed: Aug. 8, 1983

[30] Foreign Application Priority Data

Aug. 6, 1982 [GB] United Kingdom ............... 8222710
Apr. 7, 1983 [GB] United Kingdom ............... 8309474

[51] Int. Cl.⁴ ............................................. F16B 19/10
[52] U.S. Cl. .................................... 411/40; 411/55; 411/181
[58] Field of Search .................................. 411/40–45, 411/54, 55, 57, 60, 173, 180, 181

[56] References Cited

U.S. PATENT DOCUMENTS

| 1,850,768 | 3/1932 | Peirce | 411/55 |
| 2,796,907 | 6/1957 | Dumas | 411/55 |
| 3,465,637 | 9/1969 | Cushman et al. | 411/40 |
| 3,493,254 | 2/1970 | Summerlin et al. | 411/39 |
| 3,683,740 | 8/1972 | Martin | 411/40 |

FOREIGN PATENT DOCUMENTS 58019 12/1924 Sweden ............................ 411/55
2041136 9/1980 United Kingdom ............... 411/180

Primary Examiner—Gary L. Smith
Assistant Examiner—Neill Wilson
Attorney, Agent, or Firm—Oblon, Fisher, Spivak, McClelland & Maier

[57] ABSTRACT

An anchor nut fastener device is of the type comprising a tubular body portion (11) and a nut portion (12) which tapers externally, whereby when the body portion is inserted in a suitable hole in a workpiece and the nut portion (12) is forced into the body portion (11), the taper on the nut portion (12) both radially expands the body portion into engagement with the wall of the workpiece hole and also engages the nut portion in the body portion, thereby to provide an anchor nut in the workpiece. The external taper on the nut portion (12) comprises a first, relatively long, part (24) of a relatively shallow taper and a second, relatively short, part (26) of relatively steep taper further away from the body portion than is the first part and extending radially outwardly of the first part. The end of the body portion (11) is enlarged to provide a head (10), and a countersink (14) into which the leading end of the nut can be enlarged.

6 Claims, 13 Drawing Figures

ANCHOR NUT FASTENER DEVICE

The invention relates to an anchor nut fastener device and to apparatus for installing the same.

More particularly it relates to an anchor nut fastener device of the type comprising a tubular body portion and a nut portion which tapers externally whereby when the body portion is inserted in a suitable hole in a workpiece and the nut portion is forced into the body portion, the taper on the nut portion both radially expands the body portion into engagement with the wall of the workpiece hole and also engages the nut portion in the body portion, thereby to provide an anchor nut in the workpiece.

The nut portion may be forced into the body portion by applying opposing forces axially of the fastener to both ends of the device, i.e. to the wider end of the tapered nut portion and the remote end of the body portion. Where access is available to both ends of the fastener device, this may be done for example, in a press, or vice.

Preferably, however, the fastener device is capable of blind installation, that is by access to one side only of the workpiece. Such blind installation is usually achieved by screwing a threaded mandrel into the nut portion, supporting the remote end of the body portion against axial movement, applying axial force to the nut portion (either by appropriate rotation of the mandrel without axial movement so as to screw the nut portion along the mandrel, or by axial movement of the mandrel, preferably without rotation thereof) to pull the nut portion into the body portion until the nut portion is sufficiently engaged in the body portion and the body portion is sufficiently engaged in the workpiece hole, and then unscrewing the mandrel from the nut portion.

Advantageously the fastener device, during and after installation, exerts a compressive force on the outside faces of the workpiece which urges them together. This more positively retains the fastener in the workpiece, and moreover enables the fastener device to be used in a workpiece which comprises two or more sheets so as to secure the sheets together, in addition to providing an anchor nut in them.

Commonly the fastener device is initially formed in one piece, the nut portion being joined to the body portion by a frangible part which breaks upon initial application of force.

Such anchor nut fastener devices are well known in the part of mechanical assembly, and many variant designs have been proposed.

The user of such fastener devices obviously requires that, in use, the installed fastener is reliable and will withstand at least a certain minimum force to push it out of the workpiece and/or pull it out of the workpiece. At the same time, the user will want to stock as few different sizes or varieties of fastener as possible. That is to say, one size of fastener must be capable of reliable installation in workpieces of as wide a range of thicknesses (known in the art as the "grip range") as possible.

In order to improve resistance to push out and pull out, it is desirable that the nut portion should enter fully into the body portion, so that the leading end of the nut portion reaches the remote end of the body portion and can there be radially expanded. However, it has been found with existing fasteners that, for identical fasteners, if the nut portion is to be able to enter fully into the body portion over a substantial grip range, then the diameter of the workpiece hole (i.e. the "hole size") into which the fastener is installed must be chosen in accordance with the actual workpiece thickness (i.e. grip) in each case. Thus, if the grip is larger, then the hole size must be larger (or the nut portion will not fully enter the body portion), and if the grip is smaller then the hole size must be smaller (or the fastener may not be retained in the workpiece).

This is a practical disadvantage, and it is advantageous for the user to be able to provide workpiece holes of the same diameter, regardless of the grip within as wide a range as possible, for optimum installation therein of the same size of fastener.

The invention provides, in one of its aspects, an anchor nut fastener device of the type comprising a tubular body portion and a nut portion which tapers externally whereby when the body portion is inserted in a suitable hole in a workpiece and the nut portion is forced into the body portion, the taper on the nut portion both radially expands the body portion into engagement with the wall of the workpiece hole and also engages the nut portion in the body portion, thereby to provide an anchor nut in the workpiece; in which the external taper on the nut portion comprises a first, relatively long, part of a relatively shallow taper and a second, relatively short, part of relatively steep taper further away from the body portion than is the first part and extending radially outwardly of the first part;

whereby, when the nut portion is forced into the body portion as aforesaid until the leading end of the nut portion reaches the remote end of the body portion, so that it can there be radially expanded, the first part of the external taper on the nut portion has expanded the body portion relatively gently, and the second part of the external taper on the nut portion has entered and expanded the other end part of the body portion relatively greatly.

Preferably the end of the body portion remote from the nut portion has an internal radial enlargement into which the leading end of the nut portion can be expanded.

Preferably the end of the body portion remote from the nut portion has an external radial enlargement which, when the body portion is inserted into a suitable hole in a workpiece as aforesaid, contacts the workpiece around one end of the hole.

Alternatively, the end of the body portion remote from the nut portion is adpated to be radially expanded, after the body portion has been inserted in the hole in the workpiece as aforesaid, to contact the workpiece around one end of the hole.

The invention also provides, an anchor nut fastener device of the type comprising a tubular body portion and a nut portion which tapers externally whereby when the body portion is inserted in a suitable hole in a workpiece and the nut portion is forced into the body portion, the taper on the nut portion both radially expands the body portion into engagement with the wall of the workpiece hole and also engages the nut portion in the body portion, thereby to provide an anchor nut in the workpiece; in which the external taper on the nut portion comprises a first, relatively long part of relatively shallow taper and a second, relatively short, part of relatively steep taper further away from the body portion than is the first part and extending radially outwardly of the first part;

and the end of the body portion remote from the nut portion is radially enlarged both internally and externally;

whereby, when the body portion is inserted into a suitable hole in a workpiece until the external radial enlargement contacts the workpiece around one end of the hole and the body portion protrudes beyond the other end of the hole, and the nut portion is then forced into the body portion as aforesaid until the leading end of the nut portion reaches the internal radial enlargement of the body portion for local radial expansion thereinto, the first part of the external taper on the nut portion has expanded the part of the body portion within the workpiece hole into engagement therewith, and the second part of the external taper on the nut portion has entered the protruding part of the body portion and has expanded it further to enhance contact of the appropriate part of the body portion with the workpiece around the aforesaid other end of the hole.

Preferably the first part of the external taper of the nut portion has an included angle of less than five degrees, and preferably the second part of the external taper of the nut portion has an included angle of greater than ten degrees.

When the fastener device is formed initially as one piece, the nut portion being joined to the body portion by a frangible part, preferably the junction of the nut portion and the body portion is provided by an overlap of the narrow end of the nut portion inside the adjacent end of the body portion, the nut portion in the region of the overlap being of reduced wall thickness, so as to present an annular shoulder facing towards the remote end of the body portion surrounding an at least partially internally tapered part of the nut portion.

Some specific embodiments of the invention will now be described by way of example and with reference to the accompanying drawings, in which:

FIG. 1 is a longitudinal axial section through an anchor nut fastener device inserted in a workpiece, and through the mandrel and nosepiece of a tool for installing the fastener, the mandrel being shown not in section;

FIGS. 2 and 3 are end elevations of the fastener taken on the lines 11—11 and 111—111 respectively of FIG. 1;

Figure 1:
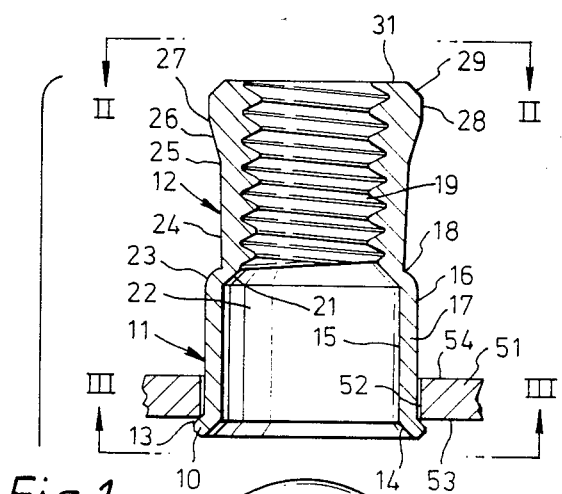
Figure 4:
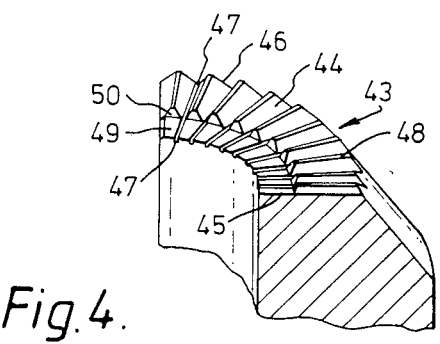
FIG. 4 is a perspective view of part of the nosepiece of FIG. 1.
Figure 7:
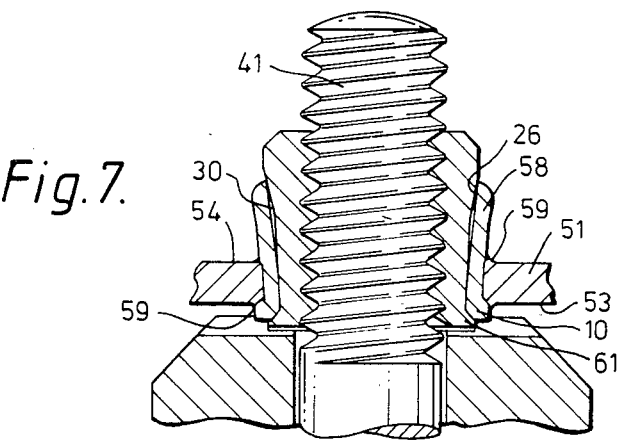
Figure 8:
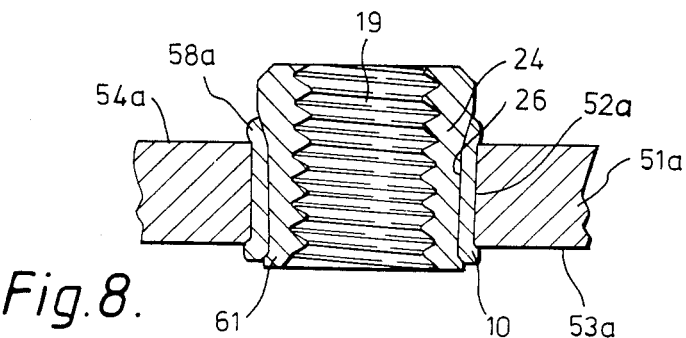
Figure 9:
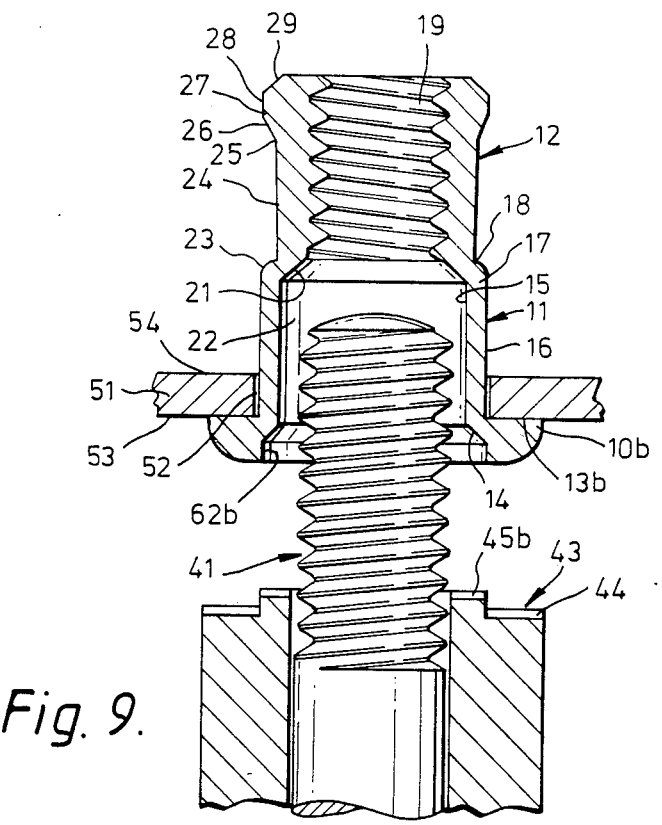
Figure 10:
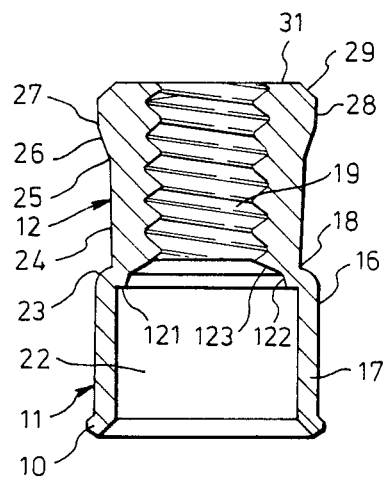
Figure 11:
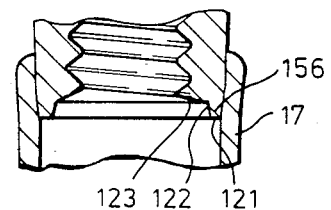
Figure 12:
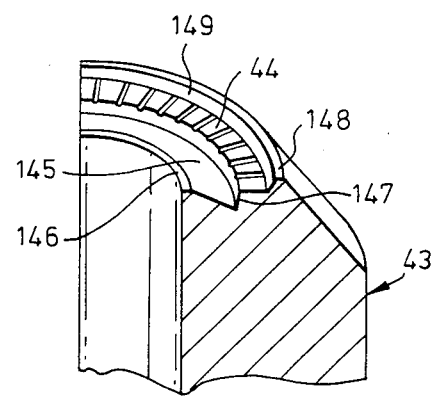
Figure 13:
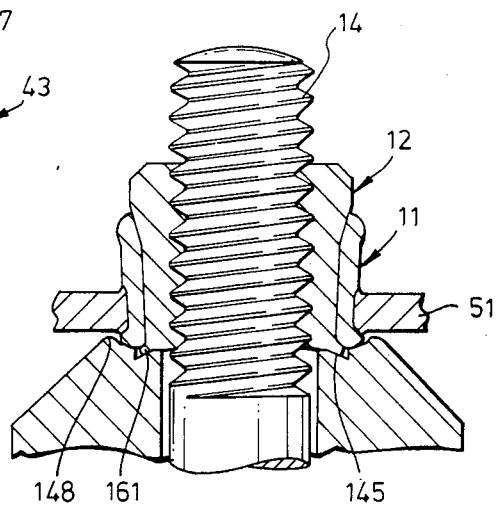

FIG. 8 corresponds to FIG. 7 and shows an identical fastener fully installed in a workpiece of substantially greater thickness; after the removal of the installation tool;

FIG. 9 corresponds to FIG. 1 and shows a fastener with an alternative head form together with a nosepiece of appropriate form;

FIG. 10 is a longitudinal section through a modified anchor nut fastener device and corresponds to part of FIG. 1;

FIG. 11 is a section of an intermediate stage in the installation of the fastener of FIG. 10;

FIG. 12 is a perspective view of the corresponding installation tool nosepiece, and corresponds to FIG. 4; and FIG. 13 is a longitudinal section through the fully installed modified anchor nut and the installation tool, and corresponds to FIG. 7.

Figure 2:
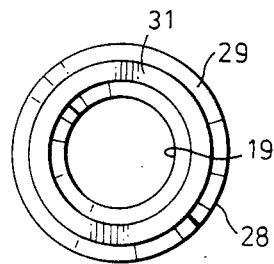
Figure 3:
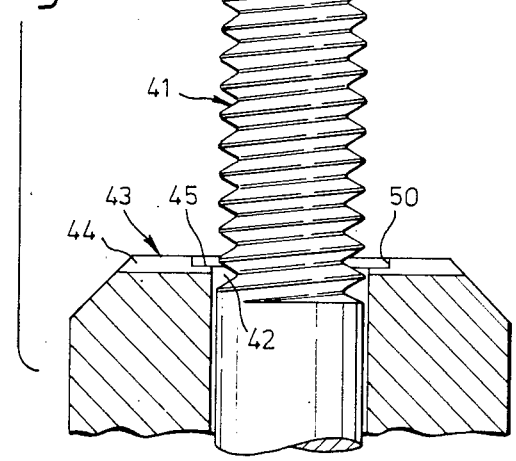
Figure 3:
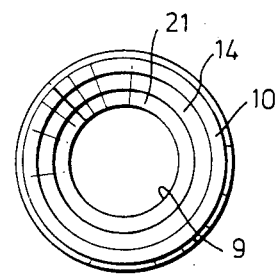

The anchor nut fastener device illustrated in FIGS. 1, 2 and 3 is a one-piece metal structure and comprises essentially a tubular body portion 11 formed integrally with an externally tapered nut portion 12. The free end of the body portion, i.e. the end remote from the nut portion is radially enlarged both externally and internally by having its extremity flared outwardly at 45°, to form a head 10 with an external "countersink" head surface 13 and a corresponding internal flare or countersink 14. The internal surface 15 and external surface 16 of the body portion 11 are each of uniform diameter throughout its length, so that the wall 17 is of uniform thickness throughout its length, and the flared head end 10 also has substantially the same wall thickness. The internal surface 15 of the body portion defines a bore 22 extending completely through it.

At its other end the body portion 11 joins the nut portion 12. In this example, the nut portion is tapered externally throughout substantially all its length, the taper extending as far as the junction with the body portion 11. The narrow end 18 of the taper is of substantially the same external diameter as the internal diameter of the body portion 11. The nut portion 12 is internally threaded at 19, the thread extending completely through the nut. At the narrow end of the nut the thread is provided with a "lead-in" chamfer or countersink 21 at 45°, which connects the end of the bore 22 with the end of the thread 19. Externally the end of the body portion 11 is radiused in section to form a shoulder 23 which joins the narrow end 18 of the nut taper. The thickness of the wall of the nut portion is greater than that of the wall of the body portion.

The external taper on the nut 12 comprises two parts; a first, relatively long part 24 of relatively shallow taper, extending from the narrow end 18 to a position 25 about two-thirds of the way along the nut portion; and a second, relatively short part 26 of relatively steep taper extending radially outwardly from the wide end 25 of the shallow taper and axially for a further distance of about one-sixth of the length of the nut. Beyond the wide end 27 of the steep taper, the external surface of the nut 12 comprises a short length 28 of uniform external diameter, followed by a 45° chamfer portion 29, which joins into an approximately annular flat end face 31 of the nut. The end face 31 has an outside diameter approximately equal to the diameter of the wide end 25 of the shallow taper 24, and the inside of the end face 31 is defined by the opening of the nut thread 19 into it. The outside diameter of the part 28 is substantially the same as the diameter of the outside surface 16 of the body portion 11.

An example of apparatus for installing the example fastener is illustrated in FIGS. 1 and 4. The apparatus is provided by a handheld power tool which includes a threaded mandrel 41 which protrudes through the central aperture 42 of an annular nosepiece 43. The tool includes means (not shown) for rotating the mandrel, in either direction, with respect to the nosepiece, which may comprise an air motor driving the mandrel through a torque-limiting clutch. Such installation tools are in general well known in the art of installing anchor nut fastener devices and will not be described further except insofar as is relevant to the present invention.

The nosepiece of this example comprises a radially outer part 44 for engaging the flared end or head 10 of the fastener body portion 11, and a radially inner part 45 for engaging the leading end of the fastener nut portion 12 when it has been pulled completely into the body portion. The radially inner part 45 is recessed axially below the outer part 44, for reasons which will become aparent later. Both parts 44 and 45 are serrated, to better engage the respective portions of the fastener and restrain them against rotation. The serrations are provided by radially extending V-section teeth 46 and grooves 47, the teeth and grooves increasing in width towards the outside of the nosepiece. The teeth on the outer part 44 are of full height with narrow flat top surfaces 48. Since the inner part 45 has been recessed below the outer part, the grooves 47 in them are very shallow and the teeth have wide flat top surfaces 49. The shallow grooves 47 in the inner part 45 are continuations of the roots of the deeper grooves 47 in the outer part 44, and the inner ends 50 of the teeth 46 on the outer part lie on a cylindrical surface and provide a peripheral wall around the inner part 45 of the nosepiece. The tops of the teeth have small burrs throuwn up by the formation of the grooves between them.

Referring now to FIG. 1, in this example the fastener is installed in a workpiece provided by a relatively thin metal sheet 51 which has in it a circular hole 52 of diameter sufficient to admit entry and passage of the part 28 of the nut portion and the part 16 of the body portion, but less than the outside diameter of the head 10 of the body portion.

Figure 5:
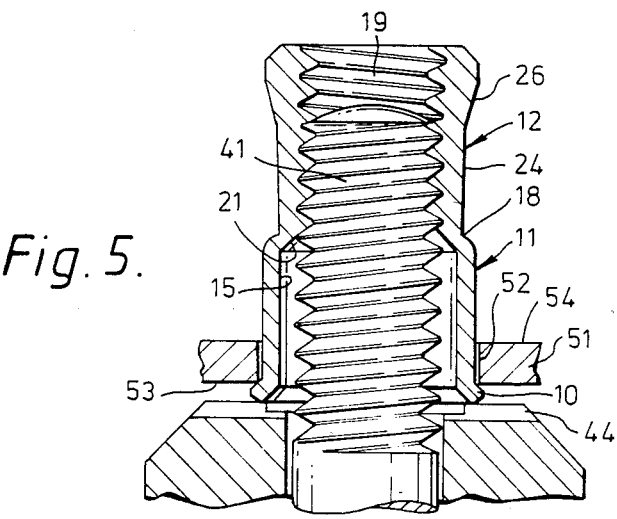
FIGS. 5, 6 and 7 are similar to FIG. 1 and show successive stages in the installation of the fastener.

The fastener may be inserted by hand, nut portion first, through the hole 52 until the external surface 13 of the head 10 contacts the nearer face 53 of the sheet around the hole 52, as illustrated in the upper part of FIG. 1. The installation tool is then offered up, as also illustrated in FIG. 1, with the mandrel 41 rotating in a clockwise sense (so as to screw into the nut portion), and the mandrel inserted through the bore 22 in the body portion 12 and into the nut portion, entry being assisted by the lead-in chamfer 21. The mandrel screws into the thread 19 of the nut portion until the outer part 44 of the tool nosepiece 43 contacts the front end of the head 10 of the body portion. This position is illustrated in FIG. 5. During this part of the operation, the tool operator must feed the tool forwards and push the tool towards the sheet, as the mandrel screws into the nut, to keep the surface 13 of the fastener body head 10 in frictional contact with the sheet 51 so as to restrain the fastener against rotation with the entering mandrel 41.

In order to avoid this necessity, as an alternative, the operator may initially thread the fastener onto the mandrel and then insert the mandrel and fastener together into the hole 52 until the surface 13 of the head 10 contacts the sheet face 53, as illustrated in FIG. 5. The operator then switches on rotation of the mandrel.

Whichever alternative method of initial operation is used, the installation of the fastener in the sheet then progresses in the same way from the position illustrated in FIG. 5. The continued rotation of the mandrel exerts an axial force on the nut portion 12 and the body portion 11, towards the nosepiece 44. The engagement between the nosepiece teeth 46 and the head 10 of the nut portion increases, and continues to prevent the fastener from rotating with respect to the nosepiece. The wall of the body portion 11 being relatively thin and therefore relatively weak, the increasing axial compression on the fastener first causes the body portion to shorten axially and expand slightly into contact with the wall of the hole 52. Further increase in axial compression causes the fastener to shear at the junction of the nut portion and body portion. This shearing takes place approximately along an imaginary surface, one end of which is defined by the narrow end 18 of the first taper 24 on the nut portion, and the other end of which is defined by wider end of the chamfer 21 where it meets the end of the internal cylindrical surface 15 of the body portion. The nut portion 12 thus breaks from the body portion 11 along this shear surface, and progressively enters the body portion. Rotation of the nut portion under the influence of the rotating mandrel is restrained by frictional engagement between the nut portion and body portion.

Figure 6:
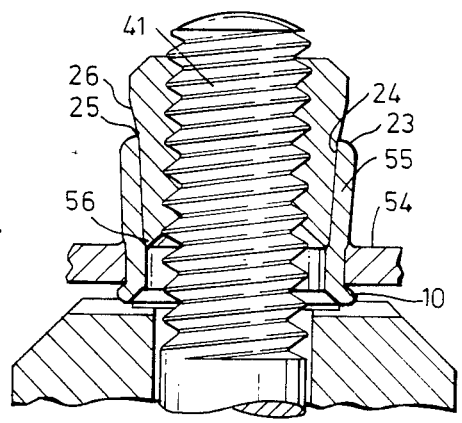

Continued rotation of the threaded mandred 41 pulls the nut portion progressively into the body portion. The entry of the first external taper 24 of the nut portion, progressively into and along the bore 22 of the body portion, causes the body portion to progressively expand relatively gently, i.e. with a relatively small amount of radial expansion of the body portion for a given amount of axial entry of the nut portion therein. FIG. 6 illustrates the position where the entry of the first tapered part 24 of the nut has caused the part of the body portion behind the back of the sheet 51 to expand, as indicated at 55. The leading end 56 of the nut portion has reached an axial position just level with the rear face 54 of the sheet 51, and the expanded part 55 of the body has just reached the rear face 54 of the sheet. At the same time, the narrow end 25 of the second and steeper taper 26 on the nut portion has reached the end of the body portion at 23. The axial compression exerted on the body portion has caused it to expand radially into contact with the wall of the hole 52, as illustrated in FIG. 6.

The force required to pull the nut portion further into the body portion now increases. The narrower end part of the first taper 24 on the nut progressively enters the zone within the sheet 51, compressing the body portion even more tightly against the wall of the hole 52. The second taper 26 on the nut portion progressively enters the tail end part of the body portion, thus expanding it relatively greatly. The nut portion continues to be pulled into the body portion by the rotating mandrel, until the leading end of the nut portion reaches the head 10 of the body portion. The leading end 56 of the nut portion is pulled into contact with the inner part 45 of the nosepiece, and this direct engagement of the nosepiece and nut portion prevents rotation of the nut portion under the increasing frictional influence of the rotating mandrel as the axial force transmitted increases. As this axial force on the nut portion increases, the leading end of the nut portion is deformed by the axial reaction of the inner part 45 of the nosepiece. The leading end part of the nut portion deforms radially outwardly until it meets, and is confined by, the inner ends 50 of the teeth on the outer nosepiece part 44 and the countersink or flare face 14 of the internal radial enlargment of the body portion head 10, to form a radially enlarged head 61. This is the position illustrated in FIG. 7. The deformed material of the nut portion is pressed tightly against these surfaces, and this has the effect of tending to expand the flared head 10 of the body portion even more tightly against the front face 53 of the sheet 51 around the hole 52.

By this time the whole of the length of the shallow taper 24 of the nut portion has entered into the body portion, further compressing the part of the body portion, which is inside the hole 52, against the wall of the hole. Apart from deforming the body portion, this also causes some deformation of the sheet around the ends of the hole, as indicated at 59 in FIG. 7. Also the part of the nut portion within the sheet has slightly contracted radially, thus slightly reducing the clearance between the mandrel and the nut thread, but not enough to cause the mandrel to bind. In addition, almost all the length of the steep taper 26 of the nut portion has entered into the end part of the body portion, thereby expanding that end part to a greater degree than the adjacent part expanded by the shallow taper 24. This causes the body portion around the narrow end 25 of the steep taper 24 to bend away from, and lose contact slightly with, the nut portion, thus leaving a small annular space 30 adjacent the junction between the shallow taper 24 and the steep taper 26.

This additional expansion of the tailmost part of the body portion by the steep taper 26 of the nut portion causes further radial expansion of the part of the body protruding from the rear of the sheet. This enhances or improves still further the contact between the expanded protruding part of the body portion and the back face 54 of the sheet 51 around the hole 52. It also increases the resistance of the installed fastener to any force which, in use thereof, tends to pull the fastener out of the hole.

The radial expansion of the body portion behind the sheet 51 has effectively formed a blind head 58, so that the sheet 51 is clamped between this blind head 58 and the pre-formed head 10 which has, as described above, been further expanded, and pressed back against the sheet, by the expansion and deformation of the leading end of the nut portion.

When this stage has been reached, the torque on the rotating mandrel suddenly increases very rapidly, and rotation of the mandrel ceases, due to the slipping clutch in the tool (alternatively the tool motor may stall).

The operator now switches the tool to reverse rotation of the mandrel (that is, in an anticlockwise sense), to unscrew the mandrel and thereby disengage the tool from the installed anchor nut.

The installed anchor nut is now securely placed in the sheet. As described above, the body portion is securely anchored in the sheet, due to both the relatively gentle expansion of the part of the body portion within the sheet into contact with the wall of the sheet hole by the first taper part of the nut portion, and by the relatively greater expansion of the protruding part of the body portion by the second part of the taper on the nut portion which, together with the preformed head 10, clamps the body portion to the sheet. Likewise, the nut portion is securely engaged in the body portion, due to the expansion of the leading end of the body portion at 61 into the flare 14 within the body portion head 10, the wedging of the tapers on the nut portion into the body portion, and the clamping effect, between the second taper 26 and the head 61 of the nut portion, on the body portion. The nut portion is in tight contact with the body portion, at least throughout the part of its length within the sheet, and the body portion is in tight contact with the sheet throughout its thickness. This provides a virtually solid anchor nut securely installed in the sheet.

The anchor nut fastener device of this example can equally well be installed in a workpiece of substantially greater thickness than that illustrated in FIGS. 5, 6 and 7. FIG. 8 corresponds to FIG. 7, elements which differ between the two Figures being designated in FIG. 8 by the addition of the suffix a to the reference numeral. Thus FIG. 8 illustrates an identical fastener (after the mandrel has been unscrewed and removed), installed in a hole 52a of diameter identical to that of the example of FIGS. 5-7, in a sheet 51a, of thickness about two and a half times that of the sheet 51 of FIGS. 5-7. A comparison of FIGS. 7 and 8 will show that, with the thicker sheet 51a, whilst the form of the body portion head 10 and enlarged leading end 61 of the nut portion, and their relationship to the front face 53a of the sheet, are respectively substantially the same as in FIG. 7, the blind head 58a protruding from the rear sheet face 54a is of course very much shorter, since the face 54a is substantially level with the junction between the first taper part 24 and the second taper part 26.

The fastener of the foregoing example is advantageous in that identical samples can be installed in identical diameter holes in sheets of a thickness throughout a range at least as great as illustrated in FIG. 7 and 8 respectively, whilst maintaining satisfactory resistance to both pull out and push out of the installed anchor nut. The least sheet thickness (i.e. minimum grip) is limited by the decreasing strength of the sheet as its thickness decreases. At the other end of the range, if the sheet thickness were to be increased substantially, the pull out resistance of the installed anchor nut will decrease, due to the reduced size of blind head 57a due to the reduced protrusion of the body portion beyond the sheet back face 54a.

It is possible to make such a fastener with a different head form, and FIG. 9 illustrates an example fastener with a snap-head, together with the corresponding form of installation tool nosepiece. FIG. 9 corresponds to FIG. 1, elements which differ between the two figures being designated in FIG. 9 by the addition of the suffix b. The fastener of this example is identical in design, construction and operation to that illustrated in FIG. 1–7 except that the external radial enlargement is in the form of a snap-head 10b of substantial size. The larger area 13b of this head in contact with the front face 53 of the sheet 51 enables the sheet to withstand a somewhat higher push-out loading. Since contact between the head and the sheet is at a larger radius, resistance to "torque-out" (i.e. rotation of the installed fastener in the hole) is improved. The head is also thicker, and the chamfer or countersink face 14 is connected to the exterior of the head by means of a counterbore 62b. Thus the countersink face 14 has the same relationship to the sheet front face 53, and to the fastener body portion 11, as in FIG. 7. The tool nosepiece is modified to reach into this counterbore, in that the inner part 45b of the nosepiece, which engages the leading end of the nut portion, is displaced forwardly of the outer part 44.

The example anchor nut fastener device described with reference to FIGS. 1 to 8 is made of zinc-plated low carbon steel, and dimensions of the fastener as illustrated in FIG. 1, certain related dimensions of the sheet, and parameters of the installed fasteners, are as follows:

thread 19 in nut portion: M5 metric standard
length of nut portion 12: 6.48 mm.
length of body portion 11: 4.57 mm.
outside diameter of body portion head 10: 7.52 mm.
internal diameter of body portion bore 22: 6.05 mm.
external diameter of major length of body portion: 7.06 mm.
external diameter of parallel portion 28 of nut portion: 7.06 mm.
diameter at 18 of narrow end of first taper 24: 6.32 mm.
total included angle of first taper 24: 4 degrees.
total included angle of second taper 26: 30 degrees.
axial length of first taper 24: 3.81 mm.

axial length of second taper 26: 1.04 mm.
diameter of hole 52 in sheet: 7.15 mm.
intermediate sheet thickness (FIG. 7): 1.22 mm.
maximum sheet thickness (FIG. 8): 3.16 mm.

Typical resistance figures of fastener installed in mild steel:
  intermediate sheet thickness (FIG. 7): push-out—113 Kg force; pull-out—227 Kg force.
  maximum sheet thickness (FIG. 8): push-out—113 Kg force; pull-out—454 Kg force.

The anchor nut and installation tool illustrated in FIGS. 10 to 13 are modified versions of those illustrated in FIGS. 1 to 8, like parts being designated by like reference numerals. Only the modifications will be described, the construction and operation otherwise being identical.

The modified anchor nut illustrated in FIGS. 10, 11 and 13 is modified in the region of the junction of the nut portion 12 and body portion 11. In FIG. 1, the nut portion where it overlaps inside the body portion is of reduced wall thickness by being provided with a single internal chamfer or countersink 21 which connects the end of the thread 19 of the nut portion 12 with the wall 15 of bore 22 in the body portion. As illustrated FIG. 6, this chamfer 21 defines the shape of the leading end 56 of the nut portion which is eventually deformed radially outwardly, by the nosepiece of the tool, to lock the nut portion to the body portion in the fully installed fastener.

In the modified anchor nut illustrated in FIGS. 10, 11 and 13, the single chamfer 21 has been modified. The nut portion presents an annular shoulder 121 facing towards the remote end of the body portion 11. This annular shoulder surrounds a first internally tapered part 122 of the nut portion, which is tapered at an included angle of thirty degrees. This first taper in turn surrounds a second internally tapered part 123 of the nut portion, which is tapered at an included angle of one hundred degrees, and leads into the threaded portion 19 of the nut.

As illustrated in FIG. 11, when the nut portion has sheared from the body portion and enters the latter, the annular shoulder 121 and two tapers 122 and 123 define a leading end part 156 of the nut portion which is of slightly different sectional shape than is the leading end 56 illustrated in FIGS. 1 to 9. The modified leading end 156 is thicker, and therefore stronger, at its free end adjacent the shoulder 121, and is thinner, and therefore weaker, intermediate its axial length, adjacent the junction between the tapered parts 122 and 123.

This modified fastener is preferably used with an installation tool which has a nosepiece of modified form, as ilustrated in FIGS. 12 and 13. In this modified nosepiece the radially outer part 44 is substantially similar to that illustrated in FIGS. 4 to 7. The radially inner part 145 is in the form of a outwardly directed taper or conical incline. The innermost part 146 of the part 145 is an annular flat surface, substantially level with the outer part 44. The tapered inner part 145 is axially displaced behind the outer part 44, and its outer and rearward edge joins the bottom of a cylindrical wall 147 leading up to the outer part 44. Radially outside the part 44 is a forwardly projecting annular rim or lip 148, which has a slightly tapering inner face 149.

When the tool with the modified nosepiece is used to install the modified fastener, the procedure is similar to that described with reference to FIGS. 5 to 8, with the difference that the rim 148 with its tapering inner surface 149 assists in aligning the nosepiece with the head 10 of the fastener body portion. The tapered surface 145 assists in deflecting the leading end 156 of the nut portion outwardly into engagement with the body portion, to form a radially enlarged head 161.

The modified form of the leading end of the nut portion, illustrated in FIGS. 10 and 11, is believed to provide the advantages of a cleaner shear from the junction with the body portion, and a stronger lock from the resulting outwardly deformed head 161. It should be noted that, as illustrated in FIG. 13, the outwardly deformed head 161 need not extend radially outwardly sufficiently to contact the wall 147 at the bottom of the taper 145. The extra force required to produce this extra deformation does not result in any worthwhile increase in the strength of the lock between the fastener nut portion and body portion.

The modified fastener and nosepiece are not restricted to the details of the forgoing example. For instance, the first taper 122 inside the nut portion may be made cylindrical. The alignment rim 148 on the nosepiece may be omitted.

If the tapered surface 145 did not end at the flat annular surface 146 substantially level with the outer part 44 but continued forwardly therebeyond, its extremity might engage with the inner taper 123 inside the leading end 156 of the nut portion. Due to the angle of this taper, such engagement would tend to impede further axial movement of the nut portion towards the nosepiece, rather than assist in deflection of the leading part 156 of the nut portion.

In any of the three example fasteners described, the exterior of the nut portion of the fastener could be provided with the narrow end of the shallow taper spaced away from the leading end of the nut portion by, for example, a zone having a uniform external diameter equal to that of the narrow end of the taper. However, the body portion of the nut must be correspondingly modified to place the part thereof, into which the leading end of the nut is radially expanded, in the appropriate axial position.

It may not be necessary to provide an enlarged preformed head 10 on the body portion, provided that when the leading end of the nut portion is radially expanded this then radially expands the adjacent end of the body portion sufficiently to form the head on the body portion at that stage. This may be assisted by the provision of a countersink at the adjcent end of the hole 52 in the sheet. If there is no preformed head, the tool nosepiece contacts both the front face of the sheet and the end of the body portion of the fastener.

I claim:
1. An anchor nut fastener device comprising:
   a hollow tubular body portion formed of a plastically deformable material and having:
   (a) a longitudinal axis,
   (b) an inner surface,
   (c) an outer surface,
   (d) a first longitudinal end,
   (e) a second longitudinal end opposite said first end;
   a flared portion integral with said first end of said body portion; and
   a hollow tubular nut portion formed of said plastically deformable material and having:
   (a) a longitudinal axis coaxial with said longitudinal axis of said body portion;

(b) an inner surface, a diameter of said nut portion inner surface being smaller than the diameter of said body portion inner surface,
(c) screw threads extending along the longitudinal length of said nut portion inner surface,
(d) an outer surface,
(e) a first longitudinal end integrally formed with said second end of said body portion,
(f) a second longitudinal end opposite said first end of said nut portion;

wherein said nut portion outer surface comprises:
(a) a relatively long portion extending from said first end of said nut portion towards said second end of said nut portion, a diameter of said long portion at said nut portion first end being substantially equal to said body portion inner diameter, said relatively long portion tapering outward by a first angle such that a diameter thereof increases toward said second end of said nut portion,
(b) a relatively short portion extending from said relatively long portion to said second end of said nut portion, said relatively short portion tapering outward by a second angle, larger than said first angle, such that a diameter thereof increases toward said second end of said nut portion, wherein a wall thickness of said nut portion at said second end thereof is greater than a wall thickness of said body portion, whereby initial movement of said nut portion in a longitudinal direction into said body portion causes a radial expansion of said body portion by coaction of said body portion with said relatively long portion, and whereby further movement of said nut portion into said body portion causes radial expansion of said body portion by coaction of said body portion with said relatively short portion.

2. The anchor nut fastener device of claim 1 wherein said screw threads extend to a position along said longitudinal length of said nut portion corresponding to said relatively short portion of said nut portion outer surface.

3. The anchor nut fastener device of claim 1 or 2 wherein said nut portion inner surface diameter is constant.

4. An anchor nut fastener device as claimed in claim 1 wherein said first angle is less than five degrees.

5. An anchor nut fastener device as claimed in claim 1 wherein said second angle is greater than ten degrees.

6. An anchor nut fastener device as claimed in any of claims 4 or 5 or 1, which fastener device is formed initially as one piece, the nut portion being joined to the body portion by a frangible part, in which:
the junction of the nut portion and the body portion is provided by an overlap of the first end of the nut portion inside of the adjacent second end of the body portion,
the nut portion in the region of the overlap being of reduced wall thickness as compared to a remainder of said nut portion, so as to define at said body portion second end an annular shoulder surrounding an at least partially internally tapered part of the nut portion.

* * * * *